United States Patent [19]
Kronogård

[11] 3,979,915
[45] Sept. 14, 1976

[54] POWER PLANT FOR A CRAWLER VEHICLE

[75] Inventor: Sven Olof Kronogård, Lomma, Sweden

[73] Assignee: United Turbine AB and Co., Kommanditbolag, Malmo, Sweden

[22] Filed: May 2, 1974

[21] Appl. No.: 466,501

[30] Foreign Application Priority Data
May 22, 1973 Sweden .............................. 7307158

[52] U.S. Cl. .......................... 60/718; 60/39.16 R; 60/39.16 S; 172/2; 172/3; 180/53 A; 180/54 C

[51] Int. Cl.² ...................... F02B 73/00; F02C 3/10

[58] Field of Search .................. 60/716–718, 60/39.15, 39.16, 39.16 SI; 180/6.48, 6.3, 53 A, 54 C, 70; 172/2, 3

[56] References Cited
UNITED STATES PATENTS

| | | |
|---|---|---|
| 2,595,336 | 5/1952 | Corsentino ........................ 180/54 C |
| 2,723,531 | 11/1955 | Wosika ................................ 60/718 |
| 3,100,378 | 8/1963 | Austin et al. ................... 60/39.16 SI |
| 3,197,962 | 8/1965 | Suttles ................................ 60/717 |
| 3,266,248 | 8/1966 | Leslie ........................... 60/39.16 SI |
| 3,601,980 | 8/1971 | Faber ................................. 60/717 |

*Primary Examiner*—Allen M. Ostrager
*Attorney, Agent, or Firm*—Holman & Stern

[57] ABSTRACT

The power plant of a crawler vehicle is a gas turbine having at least two turbine rotors interconnected by a variable transmission. One of the rotors is primarily intended for driving the tracks while the other rotor is intended primarily for auxiliary purposes, i.e. steering, operating the working tool and so forth, the variable transmission providing a way of transferring power from any of the rotors to the other, as operating conditions require.

2 Claims, 3 Drawing Figures

POWER PLANT FOR A CRAWLER VEHICLE

BACKGROUND OF THE INVENTION

Big earth moving and similar transportation crawler vehicles, as well as certain military vehicles are often provided with a big prime mover and a very complicated multi purpose transmission and hydraulic system. This suffers considerable losses and requires an extensive and power consuming cooling system. Alternatively a more complicated engine plant including two prime movers is used, one prime mover being used for propelling the vehicle, and the other (smaller) prime mover being used for driving auxiliary components.

When two prime movers of about the same size are included, both are usually utilized for propulsion purposes, and one of them furthermore for driving bigger auxiliaries and servo systems.

It is evident that such systems will have high transmission losses, are expensive, and on many occasions also demand considerable space and require complicated governing means. The two prime movers of a plant will seldom be operated at full power output simultaneously, as it is evident that a loading apparatus cannot be fully utilized when the vehicle is moving, and reversely the vehicle will not be moved to any extent when the loading apparatus is used.

Tests of a plant including a prime mover and hydraulic transmissions for various purposes have shown some improvements, but the plant still has a number of disadvantages concerning efficiency, cooling, operation in cold climate, weight and servicing.

SUMMARY OF THE INVENTION

According to the present invention a power plant is proposed, which removes, or reduces, above mentioned disadvantages. The invention is characterized in that the prime mover of the plant is a gas turbine having at least two rotor operating upon separate shafts interconnected by a variable transmission, of which shafts one is primarily connected to the track driving means, while the other shaft is adapted primarily to supply power to means for steering the vehicle by way of the tracks as well as to means for operating a loading apparatus, a treshing combine, a processing machine, or the like.

The system with separate turbine rotors for propulsion and for auxiliary purposes, respectively, will provide an optimal utilization of the totally available power. Furthermore transmission losses arising, in use, in the power turbine or in the auxiliary turbine, respectively, may be transferred to and utilized in the opposite turbine, and the remaining losses transferred into exhaust gas heat, which may be largely reclaimed. Cooling systems and corresponding auxiliary apparatus may be reduced, as well as the pertaining cooling and ventilation losses, which results in a desirable increase of fuel economy and initial costs. According to the invention it is possible to obtain an air cooled system, having simple governing means, and improved operating and working properties.

DESCRIPTION OF SOME PREFERRED EMBODIMENTS

Figure 1:
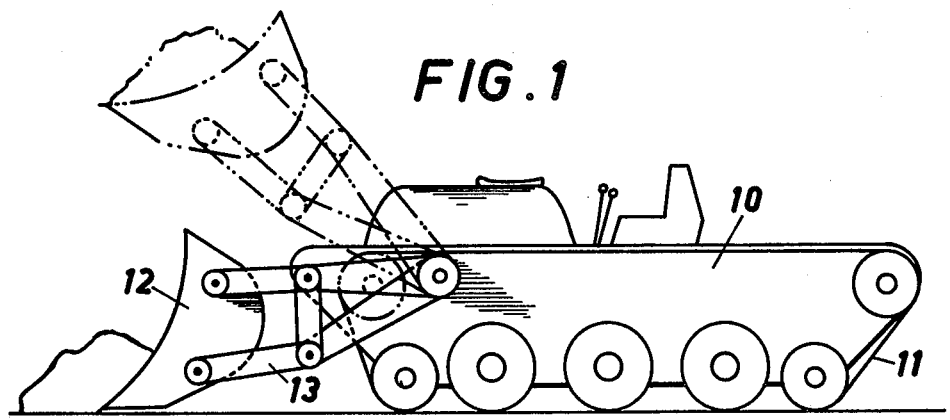
FIG. 1 shows, very schematically, an elevation of such a vehicle.

The front loader 10 shown in FIG. 1 is provided with two driving tracks 11 and a loading apparatus 12, being a shovel mounted at pivotable arms 13. These are provided with hydraulic power means (not shown) for lifting the shovel and tilting the same, when in lifted position.

Steering of the vehicle is in known manner obtained by driving one track faster than the other, which possibly is braked to a standstill, or is driven in reverse.

Considerable power is required for steering purposes as well as for the operation of the loading apparatus and other auxiliaries, especially where the soil resistance is high, the terrain is hilly, or the load is heavy.

The prime mover is a gas turbine 14 comprising two separate power turbine rotors, the shafts of which are interconnected in any suitable manner, preferably by means of an infinitely variable transmission 15, in such a manner that the totally available power may be used for driving the tracks, or for performing the auxiliary duties. The prime mover is according to FIG. 2 mounted with its axis longitudinally of the vehicle.

The gas turbine in the usual manner includes a compressor 16, driven by one of the turbine rotors mentioned above, or by a third turbine rotor. The air is, by way of an air preheater (not shown), conveyed to two combustion chambers 17.

The shaft 18 of the first turbine rotor drives an output shaft 20 for the two tracks 11a and 11b by way of a bevel gear 19.

The second turbine shaft by way of a transmission 21 drives an electric generator 22 and other auxiliaries 23, including lubricating and fuel oil pumps, and is also, by a further transmission 21a, connected to the compressor rotor.

The transmission 21 further drives a hydrostatic or other variable transmission 24 for steering the vehicle by way of the tracks, as well as a hydraulic pump 25 supplying pressure fluid to the actuators of the loading apparatus. The shape and size of these actuators will depend upon the type of loading apparatus used, but they are of well known design so their function need not be explained in detail.

Transmission 21a includes a shaft connection between the power turbine for the vehicle and the gas producing part of the plant, which makes possible engine braking with the compressor as well as the turbine systems. There is further a free wheel and/or clutch arrangement between the auxiliary turbine for steering function and the power turbine, which makes possible a utilization of the inertia of the vehicle as an additional power for operating the steering gear. This is important in order to provide advanced steering properties with high speed vehicles where the power consumption for rapid maneuvers is high.

In certain applications, the variabel transmission 21 may be substituted by a free wheel and/or a clutch arranged in such a manner that the auxiliary turbine, when fully relieved from steering function, may be used for augmenting the power turbine in driving the vehicle.

The hydrostatic (or alternatively mechanical) steering transmission 24 is of fully reversible type and drives two shafts 27 and 28, respectively, by a double bevel gear 26, each of said shafts in the usual manner being connected to a planetary differential gear 29 and 30, respectively. The two gears are identical and only one of them is schematically shown to illustrate the principle.

The driving shaft 20 for the tracks is at each end terminated by a ring wheel 31. The sun wheel 32 is driven by the steering shaft 27 (or 28 respectively), while an output shaft 33 to the tracks is connected to the planetary carrier 34.

The power supplied by the second turbine shaft is transferred by way of the hydrostatic transmission 24 and is added to one of the tracks and subtracted from the other hand. Furthermore steering gears and/or clutches and brakes 35 are provided to make possible a geared steering or a brake clutch steering.

Figure 2:
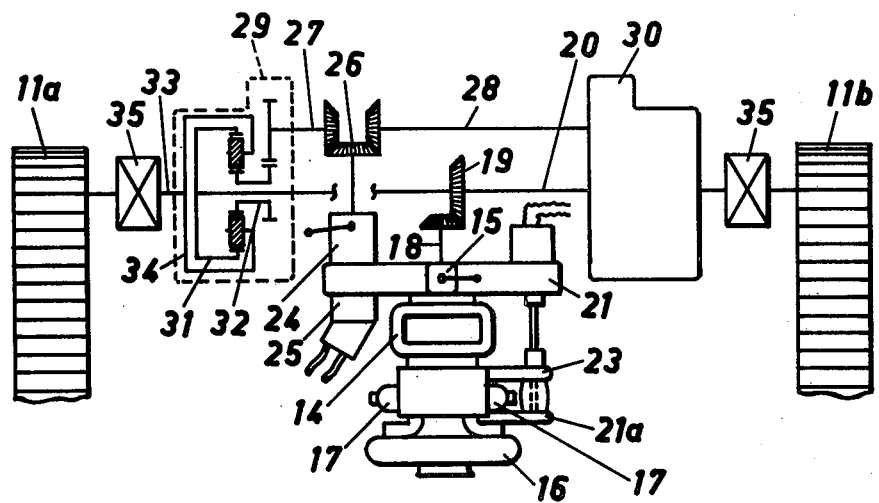
FIGS. 2 and 3 show two basic arrangement of the power plant, in which the prime mover in the first case is mounted with its axis longitudinally of the vehicle, and in the other case is mounted transversely thereof.
Figure 3:
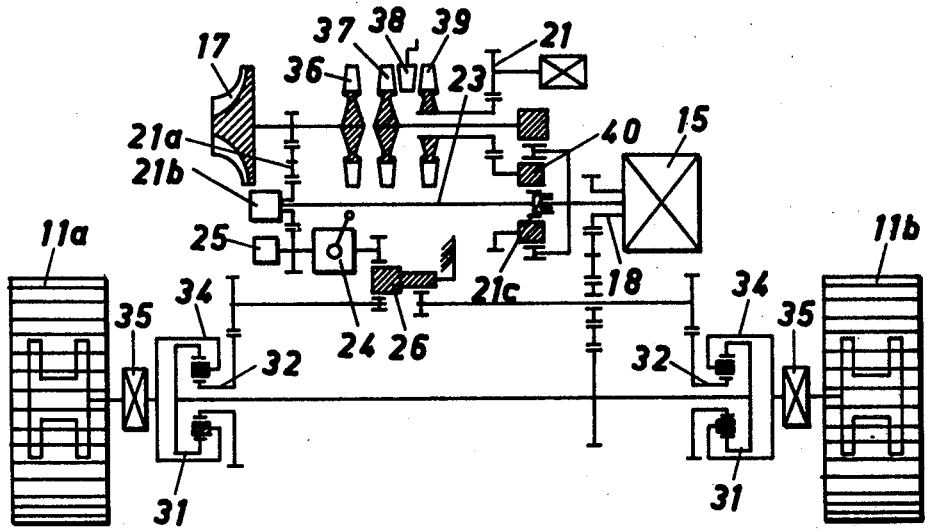

FIG. 3 shows more in detail an arrangement with a transversely mounted engine and transmission according to the invention, like elements being denoted with the same reference numerals as in FIG. 2. The differential 26 and other gears include cylindrical gear wheels and the whole plant is very compact requiring a minimum of space. The plant may be provided with a single transmission, which may be built together with the engine to a unit resulting in a considerable simplification with respect to the lubricating system, which may contain a single oil only, as well as concerning the governing apparatus.

With certain types of track vehicles having hydropneumatic suspension for the supporting wheels it is essential to be able to alter the height position and/or the inclination, longitudinally or transversely. This may be obtained, also when the vehicle is under way, by operating the hydraulic pump from the auxiliary turbine and/or the compressor turbine, if such is included, which may be brought to cooperate through transmission 21a and free wheel and/or clutch means (21b, 21c).

As examples of suitable fields of use for the invention may be mentioned front loaders, bull dozers, harvesting machines and combines, forest processing machines, mining trucks, amphibious vehicles, and certain military and civilian tracked vehicles of the multi purpose type.

The transmission system of the turbine preferably includes a free wheel between the proper turbine and the auxiliary turbine, which makes possible a partial transfer of the inertia of the vehicle to the steering gear box by way of the auxiliary turbine. When the compressor is driven by a separate turbine rotor and the latter by way of transmission 21a is connected to the auxiliary turbine, a free wheel or a clutch 21b is preferably included to make possible engine braking and starting by towing.

The auxiliary turbine and/or the power turbine, is preferably provided with adjustable inlet guide vanes to make possible a distribution of the available power between the two turbines, and the apparatus driven thereby.

The details of the invention may of course be varied in many ways within the scope of the appended claims and it is evident that the type of working or loading equipment installed, as well as the means for operating the same will not have any influence upon the working of the invention. The essential feature is that the prime mover will supply the necessary power to the various functions. The transfer to the auxiliary power may possibly be arranged electrically or mechanically.

What I claim is:

1. A crawler vehicle supported by two driving tracks and carrying a power-operated, working tool, said vehicle further including:
    a. a single prime mover consisting of a gas turbine including at least two turbine rotors operating upon separate shafts;
    b. a variable-power, transmission means interconnecting said separate shafts;
    c. means at each track for steering the vehicle by the addition or subtraction of power to the pertaining track;
    d. a first power transfer means for connecting a first of said turbine rotor shafts with both driving tracks;
    e. a second power transfer means for optionally connecting the second of said turbine rotor shafts with said track steering means, or with the power-operated tool; and
    f. guide vanes at the inlet to at least one of said turbine rotors for determining the power distribution between said two turbine rotors.

2. The structure as claimed in claim 1 in which the means at each respective track for steering the vehicle comprises a stepped, planetary gear, said variable-power transmission means including a free wheel operatively located for permitting a partial transfer of the inertia of the vehicle to the second power turbine rotor only through the steering means during vehicle-braking or when the vehicle runs downgrade.

* * * * *